Patented Aug. 30, 1949

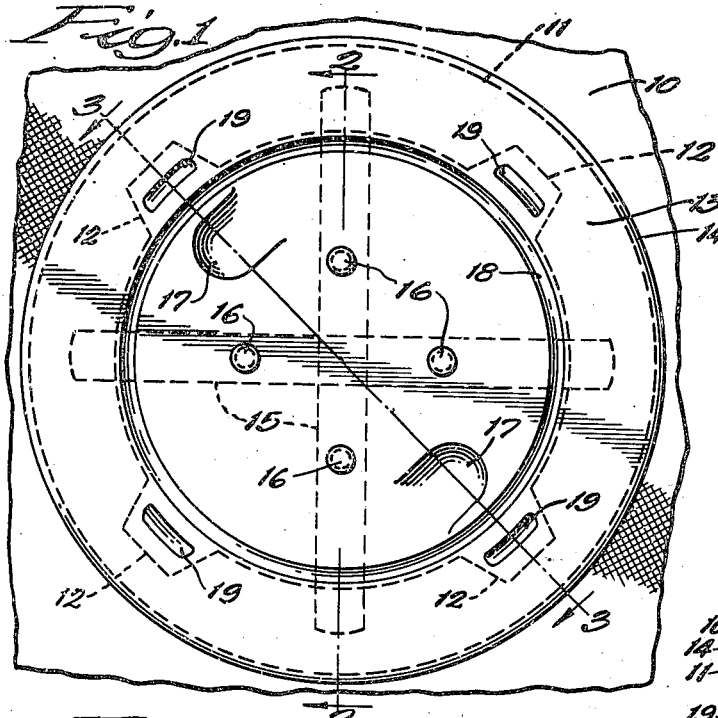
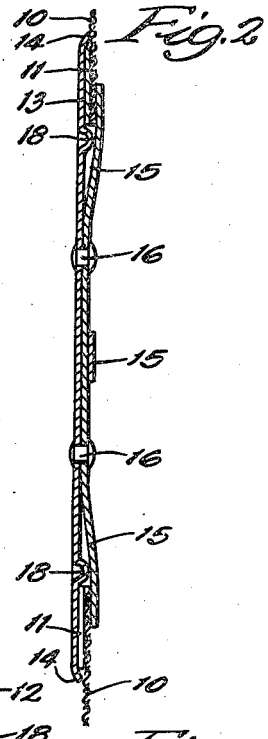
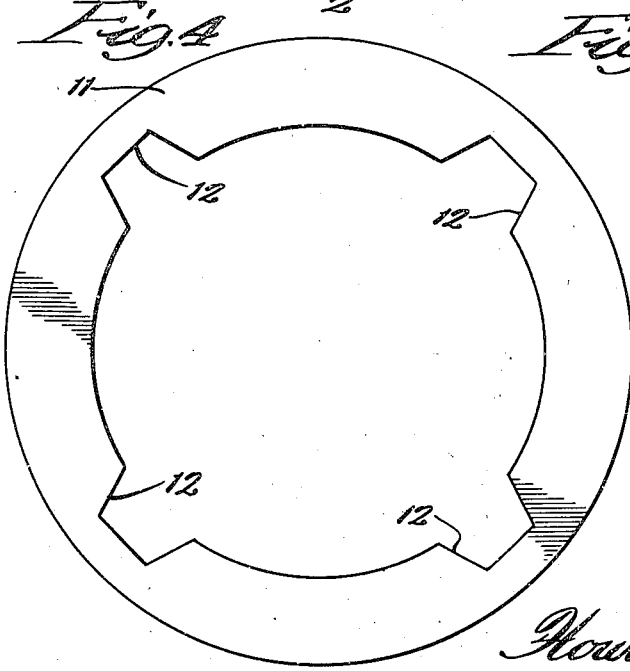
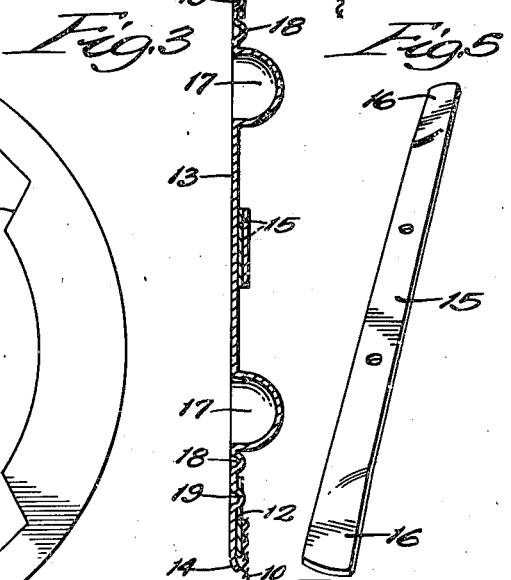
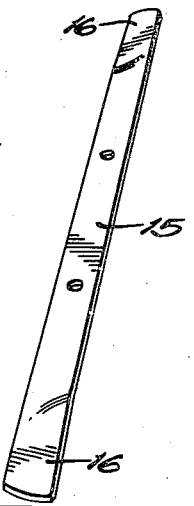

2,480,692

UNITED STATES PATENT OFFICE 2,480,692

INSPECTION COVER

Howard E. Anthony, Benton Harbor, Mich.

Application May 1, 1946, Serial No. 666,369

4 Claims. (Cl. 244—129)

This invention relates to inspection covers and more particularly to the provision of covered inspection and access openings in the skin coverings of aircraft or the like. In airplanes it has been customary to provide inspection and access openings at various points in the fuselage or wings and to cover such openings with removable covers. As heretofore constructed, such covers particularly as used on small fabric covered aircraft have been provided with springs extending beyond the edges of the cover disc to slide over the edges of the opening and secure the cover disc in place. Such covers are difficult to remove and replace and to maintain in proper position over the opening.

The present invention has for its objects to provide inspection covers which may be easily removed and replaced, preferably by turning, which are accurately located over the openings when in place, and which are securely held against accidental removal.

The above and other objects and advantages of the invention will be more readily apparent from the following description when read in connection with the accompanying drawing, in which—

Figure 1 is an elevation view of an inspection cover embodying the invention in place;

Figure 2 is a section on the line 2—2 of Figure 1;

Figure 3 is a section on the line 3—3 of Figure 1;

Figure 4 is an elevation of the reinforcing ring; and

Figure 5 is a perspective view of one of the fastening springs.

The cover as illustrated is adapted to cover an opening in the fuselage or wing of an aircraft having a fabric skin covering 10 treated in the usual manner with lacquer or the like to make it water and air tight. The skin covering 10 is formed with a circular opening therein for inspection and access purposes, such openings being located at any desired points in the aircraft skin cover. According to the present invention the skin covering is reinforced around the opening by a flat annular ring 11 which is preferably formed of plastic material whose composition is similar to that of the coating on the fabric. The inner edge of the ring is cut out at a plurality of spaced points to form notches 12 as best seen in Figure 4. The ring formed as shown may be securely fastened to the skin covering by treating it with a solvent for the lacquer material so that it will be securely cemented to the skin covering. This is preferably done before the opening is cut in the skin covering, the skin being cut out from the interior of the ring and from the notches 12 after the ring has been secured in place.

The cover proper comprises a disc 13 preferably formed of thin light weight metal of slightly larger diameter than the ring 11 and turned up at its edges as indicated at 14 to fit over the edges of the ring. To hold the disc 13 in place a pair of leaf springs 15 are secured to the inner side thereof by rivets or the like 16. The rivets 16 engage the springs adjacent the central portions to leave their ends free, as shown, and the springs are of a length less than the diameter of the disc and preferably approximately equal to the space across diametrically opposite notches 12. Preferably the ends of the springs are twisted slightly as indicated at 16 in Figure 5 so that the springs may ride more easily over the edges of the notches 12 in attaching the disc to the ring.

With the construction shown the disc is adapted to be rotated partially for both attaching it to and detaching it from the ring. To facilitate this operation the disc may have two or more recesses 17 pressed therein to receive the fingers of an operator so that he can turn the disc easily. In attaching the disc it is laid against the ring with the ends of the springs lying in the notches 12 and is then turned to cause the ends of the spring to ride over the notches and engage the inner surface of the skin covering as shown in Figure 2.

In order to locate the cover disc accurately over the opening an annular ridge 18 is preferably pressed up from the inner side thereof and is of a diameter to fit within the inner edge of the ring 11. In this way the disc is accurately located with respect to the reinforcing ring so that it will at all times properly cover the opening. Instead of a complete annular ridge it will be understood that a series of spaced projections to engage the inner edge of the ring could be used to locate the disc equally well.

Accidental removal of the disc from the reinforcing ring is prevented by inwardly extending projections 19 formed on the disc between the ends of the springs and so located as to enter the notches 12 when the disc is turned. When the disc is initially placed on the ring the projections 19 will ride over the inner surface of the ring or of the skin covering until the ring has been turned approximately 90°. At this time the projections 19 will drop into the notches 12 to hold the disc against further accidental turning.

While one embodiment of the invention has

What is claimed is:

1. An inspection cover for aircraft and the like and adapted to overlie a circular opening having a plurality of diametrically opposed notches on its inner edge, comprising a disc larger than the opening, a pair of crossed springs secured in their central portions to one side of the disc and shorter than the diameter of the disc whereby their ends can enter said notches, the disc having depressed recesses therein to receive the fingers of an operator for turning the disc and having projections on said one side between the ends of the springs to enter said notches and prevent the disc from turning.

2. An inspection cover for aircraft and the like comprising a disc adapted to overlie an opening smaller than the disc and having diametrically opposed notches on its inner edge, the disc having a raised annular ridge on one side to fit into the opening, a leaf spring extending across said one side of the disc and secured in its center portion to the disc, the ends of the spring being adapted to enter said notches in the edge of the opening, and the disc having depressed recesses in its other side to receive the fingers of an operator for turning the disc and having projections on said one side adjacent its edge to enter said notches when the disc is turned.

3. An inspection cover for aircraft and the like comprising an annular ring to be secured around an opening in an aircraft skin having a plurality of diametrically opposed spaced notches on its inner edge, a disc to fit over the ring, a pair of crossed leaf springs secured at their central parts to one side of the disc so that their ends can enter the notches in the ring, and the disc having recesses in its other side to receive the fingers of an operator for turning the disc, and having raised projections on said one side between the ends of the springs to fit into the notches when the disc is turned.

4. An inspection cover for aircraft and the like adapted to overlie a circular opening having a plurality of notches on its inner edge, comprising a disc larger than the opening, a plurality of leaf springs attached to one side of the disc and shorter than the diameter thereof and disposed to be received in said notches, said disc having elongated projections on said one side and positioned between the ends of said springs to be received in said notches.

HOWARD E. ANTHONY.

REFERENCES CITED

The following references are of record in the file of this patent:

UNITED STATES PATENTS

| Number | Name | Date |
| --- | --- | --- |
| 1,907,546 | Jarvis | May 9, 1933 |
| 2,316,507 | Dykeman | Apr. 13, 1943 |
| 2,383,200 | Kramer et al | Aug. 21, 1945 |